United States Patent
Yamazaki et al.

(10) Patent No.: US 9,939,285 B2
(45) Date of Patent: Apr. 10, 2018

(54) NAVIGATION APPARATUS

(75) Inventors: Satoshi Yamazaki, Kanagawa (JP); Kaori Amano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1953 days.

(21) Appl. No.: 12/691,626

(22) Filed: Jan. 21, 2010

(65) Prior Publication Data

US 2010/0198502 A1 Aug. 5, 2010

(30) Foreign Application Priority Data

Feb. 2, 2009 (JP) ................. 2009-021764

(51) Int. Cl.
*G01C 21/36* (2006.01)
*G09B 29/10* (2006.01)

(52) U.S. Cl.
CPC ..... *G01C 21/3679* (2013.01); *G01C 21/3682* (2013.01); *G09B 29/10* (2013.01)

(58) Field of Classification Search
None
See application file for complete search history.

(56) References Cited

U.S. PATENT DOCUMENTS 5,911,773 A * 6/1999 Mutsuga et al. ............... 701/414
6,434,482 B1 * 8/2002 Oshida et al. ................. 701/426
6,810,326 B1 * 10/2004 Kawasaki ..................... 701/410
2005/0071119 A1 * 3/2005 Obradovich ....... G01C 21/3461
702/150
2006/0052934 A1 * 3/2006 Tomita ............... G01C 21/3682
701/533
2006/0217883 A1 9/2006 Nomura

FOREIGN PATENT DOCUMENTS

| EP | 0767358 | 4/1997 |
| EP | 1635142 | 3/2006 |
| JP | 09-264750 | 10/1997 |

(Continued)

OTHER PUBLICATIONS

Aug. 6, 2013, Japanese Office Action in related application No. JP 2009-021764.

(Continued)

*Primary Examiner* — Paul Danneman
(74) *Attorney, Agent, or Firm* — Paratus Law Group, PLLC

(57) ABSTRACT

A navigation apparatus according to an embodiment of the present invention includes: map display means that displays a map on the basis of map data in a database that stores the map data, facility type information about the type of the facility and facility information about the facility; route guidance means that searches for a guide route from the current position of a navigation apparatus to a specified destination on the basis of the map data and performs route guidance; selection means that searches the database for a facility to be displayed on the map on the basis of selection conditions defined by the facility type information, the travelling direction of the navigation apparatus and a distance from the guide route to the facility; and display control means that controls the map display means so that the map display means displays the obtained facility along with its facility information on the map.

11 Claims, 9 Drawing Sheets

(56) References Cited

FOREIGN PATENT DOCUMENTS

| | | |
|---|---|---|
| JP | 10-339647 | 12/1998 |
| JP | 2001-116565 | 4/2001 |
| JP | 2001-147127 | 5/2001 |
| JP | 2001-174273 | 6/2001 |
| JP | 2003-214880 | 7/2003 |
| JP | 2003-240589 | 8/2003 |
| JP | 2005-055259 | 3/2005 |
| JP | 2006-084186 | 3/2006 |
| JP | 2006-266757 | 10/2006 |
| JP | 2006-317173 | 11/2006 |
| JP | 2007-128329 | 5/2007 |
| JP | 2008-45967 | 2/2008 |

OTHER PUBLICATIONS

Dec. 3, 2013, JP communication issued for related JP application No. 2009-021764.
Nov. 22, 2013, EP communication issued for related EP application No. 10151261.
Dec. 17, 2013, EP communication issued for related EP application No. 10151261.
Mar. 12, 2013, JPO Communication in related application No. JP 2009-021764.

\* cited by examiner

FIG. 2

| | | |
|---|---|---|
| RAMEN | RAMEN SHOP A | FACILITY INFORMATION A |
| | RAMEN SHOP B | FACILITY INFORMATION B |
| CONVENIENCE STORE A | MISO RAMEN SHOP C | FACILITY INFORMATION C |
| | RAMEN SHOP D | FACILITY INFORMATION D |
| GOLF COURSE | RAMEN SHOP E | FACILITY INFORMATION E |
| | RAMEN SHOP F | FACILITY INFORMATION F |
| ○○ GAS SERVICE STATION | ⋮ | ⋮ |
| ⋮ | | |
| | CONVENIENCE STORE ○○ | FACILITY INFORMATION G |
| | CONVENIENCE STORE △△ | FACILITY INFORMATION H |
| | ⋮ | ⋮ |
| | ○○ COUNTRY GOLF | FACILITY INFORMATION I |
| | ○× GOLF COURSE | FACILITY INFORMATION J |
| | ⋮ | ⋮ |
| | SS ○○ STORE | FACILITY INFORMATION K |
| | SS □□ STORE | FACILITY INFORMATION L |
| | SS △△ STORE | FACILITY INFORMATION M |
| | ⋮ | ⋮ |

TRAVELLING DIRECTION
ALONG ROUTE

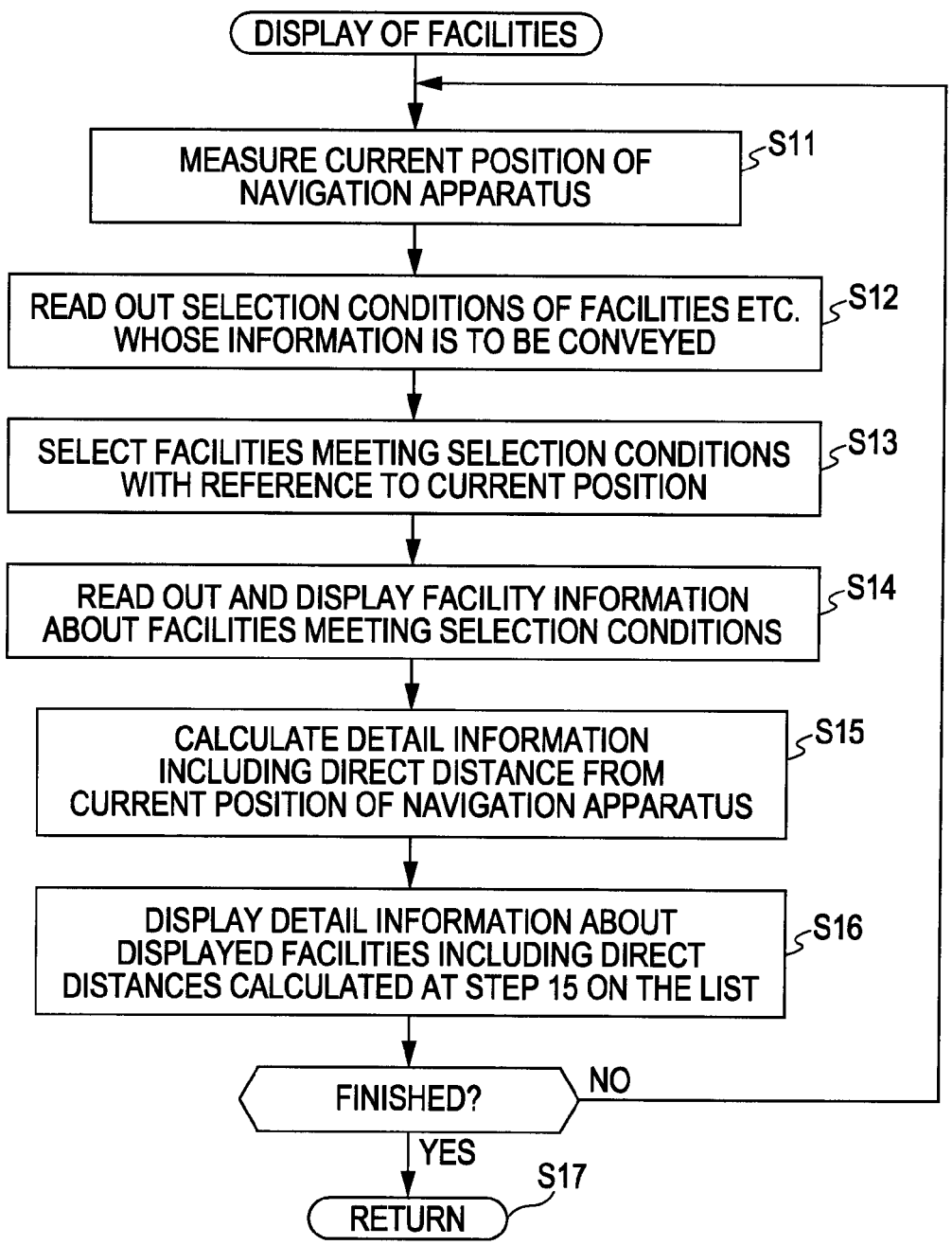

NAVIGATION APPARATUS

BACKGROUND OF THE INVENTION

Field of the Invention

The present invention relates to navigation apparatuses, and more particularly to a navigation apparatus that provides appropriate facility information on the basis of conditions preset by simple operations.

Description of the Related Art

In related art, a navigation apparatus searches for a route from the present position of the navigation apparatus to a specified destination, and then calculates the distance the navigation apparatus will travel along the route to the destination.

Then the obtained route and the calculated distance as well as the map are displayed on the display screen of the navigation apparatus so that they are shown to a user. In addition, the positions of gas service stations and other particular facilities are also indicated by symbols on the map along with the current position of the navigation apparatus.

Map data corresponding to a map displayed on the display screen of such a navigation apparatus is stored, for example, in one of divided storage areas of a CD-ROM, where the divided storage areas of the CD-ROM correspond to regional areas obtained by dividing the whole of the country.

In addition, various pieces of facility information are also stored in the form of part of a database in a storage device including the above CD-ROM.

Some navigation apparatuses, which make a database of various pieces of facility information to be displayed on a display screen and provide map information about the vicinity of the current position of the navigation apparatus, categorize the various pieces of information into pieces of facility information belonging to an upper category and pieces of facility information belonging to a lower category, and make a POI database using the pieces of facility information categorized into the upper category and the pieces of facility information categorized into the lower category.

The navigation apparatus disclosed in Japanese Unexamined Patent Application publication 2007-128329 is configured so that, if a user gives the navigation apparatus instructions to search for pieces of facility information about a facility belonging to the upper category when those belonging to the lower category are displayed, the pieces of the facility information belonging to the upper category are searched for and displayed.

SUMMARY OF INVENTION

As described above, in the above navigation apparatus, it is necessary to perform an input operation in order to search for and display, for example, the pieces of facility information belonging to the upper category when those belonging to the lower category are being displayed. Nevertheless, there is a problem in that the user may not perform operations including issuing instructions for the search while the navigation apparatus is travelling.

The present invention is achieved with the above-described situation borne in mind and provides a navigation apparatus capable of searching for and offering information about specified facilities on the basis of preset selection conditions without performing any input operation for the search.

According to an embodiment of the present invention, there is provided a navigation apparatus including: map display means that displays a map including a road and a facility on the basis of map data in a database that stores the map data, facility type information about the type of the facility and facility information about the facility; route guidance means that searches for a guide route from the current position of a navigation apparatus to a specified destination on the basis of the map data and performs route guidance from the current position of the navigation apparatus to the destination on the map on the basis of the obtained guide route; selection means that searches the database for a facility to be displayed on the map on the basis of selection conditions defined by the facility type information, the travelling direction of the navigation apparatus along the guide route, and a distance from the guide route to the facility; and display control means that controls the map display means so that the map display means displays the facility obtained by the selection means along with its facility information on the map.

According to an embodiment of the present invention, a navigation apparatus capable of searching for and offering information about specified facilities on the basis of preset selection conditions without performing any input operation for the search can be provided.

BRIEF DESCRIPTION OF THE DRAWINGS

FIG. 2 is an explanatory drawing showing facility information stored in a database of the navigation apparatus according to the embodiment of the present invention;

FIG. 9 is a flowchart showing another behavior of the navigation apparatus according to the embodiment of the present invention.

DESCRIPTION OF THE PREFERRED EMBODIMENT

Figure 1:
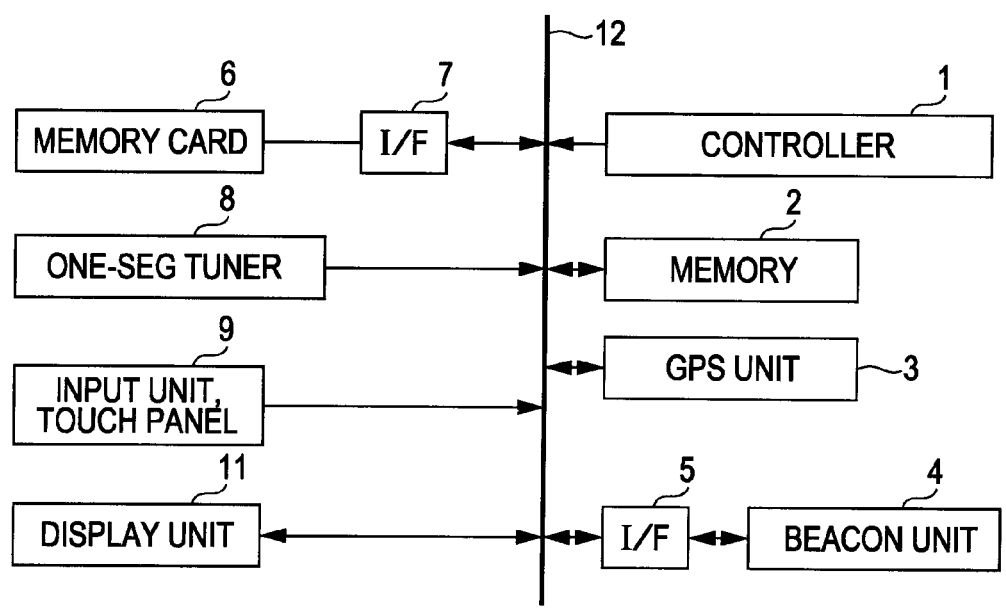
FIG. 1 is a block diagram showing a configuration of a navigation apparatus according to an embodiment of the present invention.

FIG. 1 is a block diagram showing a configuration of a navigation apparatus according to an embodiment of the present invention.

This navigation apparatus includes a controller (a route guidance section, a selection section, a display control section, a list display section, a calculation section) 1, a memory 2, a GPS unit (a route guidance section) 3, a beacon unit 4, a beacon unit interface 5, a memory card 6, a memory card interface 7.

In addition, the navigation apparatus includes a one-seg tuner 8, a touch panel 9, a display unit 11, and a system bus 12.

The controller 1 includes a microprocessor for controlling the units that constitute this navigation apparatus, and peripheral circuits of the microprocessor. The memory 2 is a storage device including a RAM, a ROM, and a CD-ROM.

The CD-ROM, for example, of the memory 2 stores a database DB.

This database DB stores the pieces of facility information that are categorized into types, where the types represent types of facilities such as "ramen (Chinese noodle) shop", "convenience store", "golf course", "gas service station" as well as map information regarding roads, land features and configurations of facilities.

This database DB stores the pieces of facility type information that are the pieces of information regarding types of facilities such as "ramen (Chinese noodle) shop", "convenience store", "golf course", "gas service station" as well as map information regarding roads, land features, configurations of facilities.

The pieces of facility information are pieces of detail information about facilities, which are categorized by the types, including the names of stores, their addresses, their locations, the names of affiliated groups, the existence or nonexistence of parking areas and seating information.

In addition, it is not typically necessary that the database DB be stored, for example, in the CD-ROM of the memory 2, and if the database DB is stored, for example, in a server installed outside a navigation apparatus, it is possible for the navigation apparatus to read out necessary information from the server via a network and store it in the memory 2 if necessary.

FIG. 2 is an explanatory drawing showing in detail the facility information including the addresses of facilities or stores, their names, their locations, and the names of affiliated groups, where the pieces of the facility information are categorized by types such as "ramen shop", "convenience store", "golf course", and "gas service station".

In addition, the pieces of facility information, which are categorized by types such as "ramen shop", "convenience store", "golf course", and "gas service station", include symbols corresponding to the types to which the facilities belong respectively.

The GPS unit 3 detects the current position of a vehicle on which the GPS unit 3 is mounted with the use of GPS signals sent from a GPS satellite.

The beacon unit 4 has a function of avoiding traffic jams, and when it receives information about a traffic jam, it searches for the optimum route to avoid the traffic jam The beacon unit interface 5 connects the beacon unit 4 to the system bus 12.

The memory card 6 is a card-type storage device.

The memory card interface 7 connects the memory card 6 to the system bus 12, which enables the memory card to access other units.

The one-seg tuner 8 is a tuner that receives one-seg waves broadcast from terrestrial digital broadcasting.

The touch panel 9 has a function of outputting a touched position detecting signal that shows a position of the surface of the display unit 11 when the position is touched by a finger or the like.

The display unit 11 displays operation icons, a road that includes the current position of a navigation apparatus, land features, facilities and the like on a liquid crystal screen, for example. The display panel 11 constitutes a map display unit.

The system bus 12 is a communication path through which the controller 1, the memory 2, the GPS unit 3, the beacon unit 4, the memory card 6, the one-seg tuner 8, the touch panel 9 and the display unit 11 communicate with each other.

The behavior of the navigation apparatus will be described below.

Figure 4:
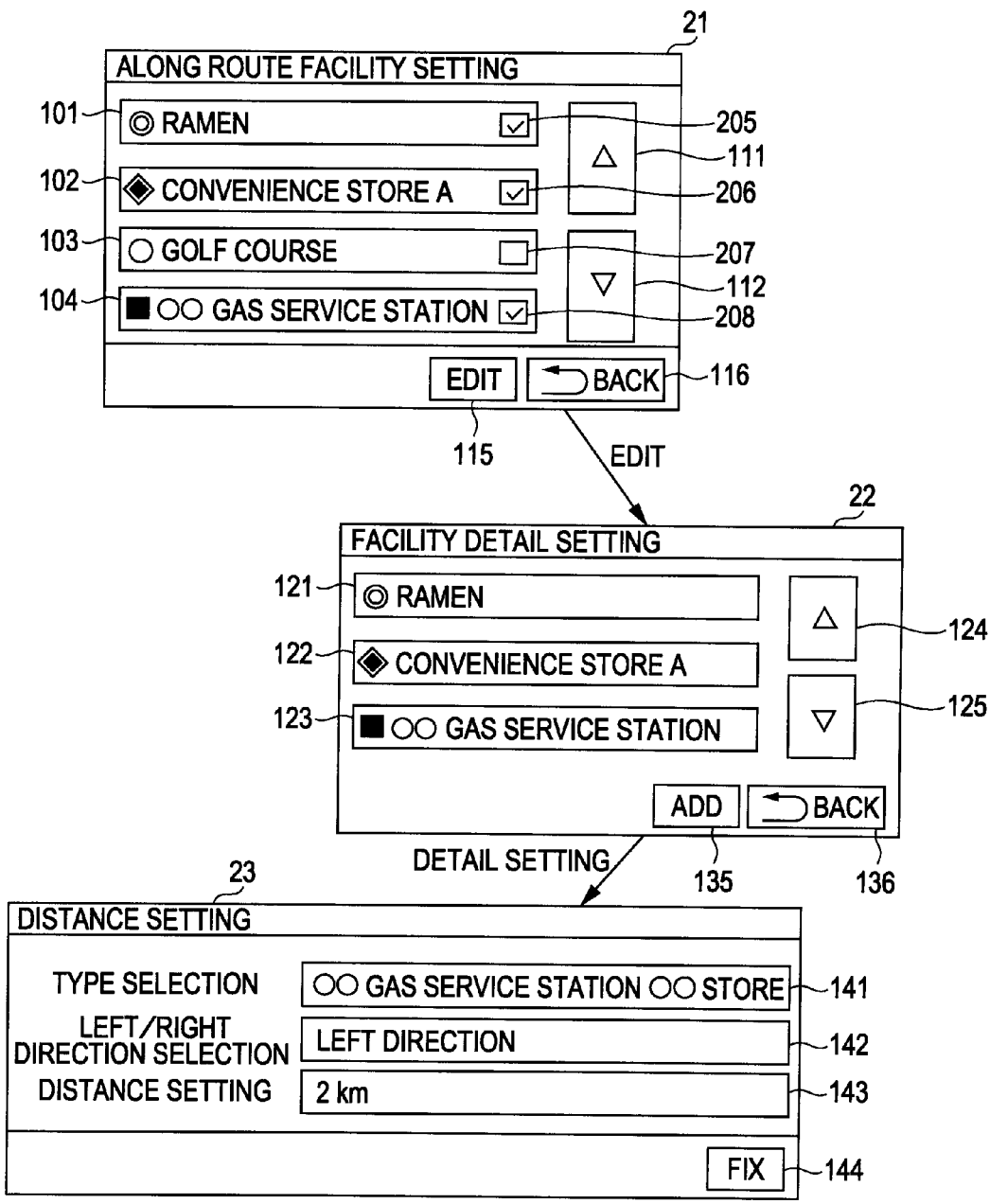
FIG. 4 is an explanatory drawing showing a screen, which is used for specifying a facility, mounted on the navigation apparatus according to the embodiment of the present invention.

FIG. 4 is an explanatory drawing showing a "facility setting" screen where selection conditions for selecting facilities, which are displayed by the navigation apparatus according to this embodiment, are specified and registered in advance.

Figure 5:
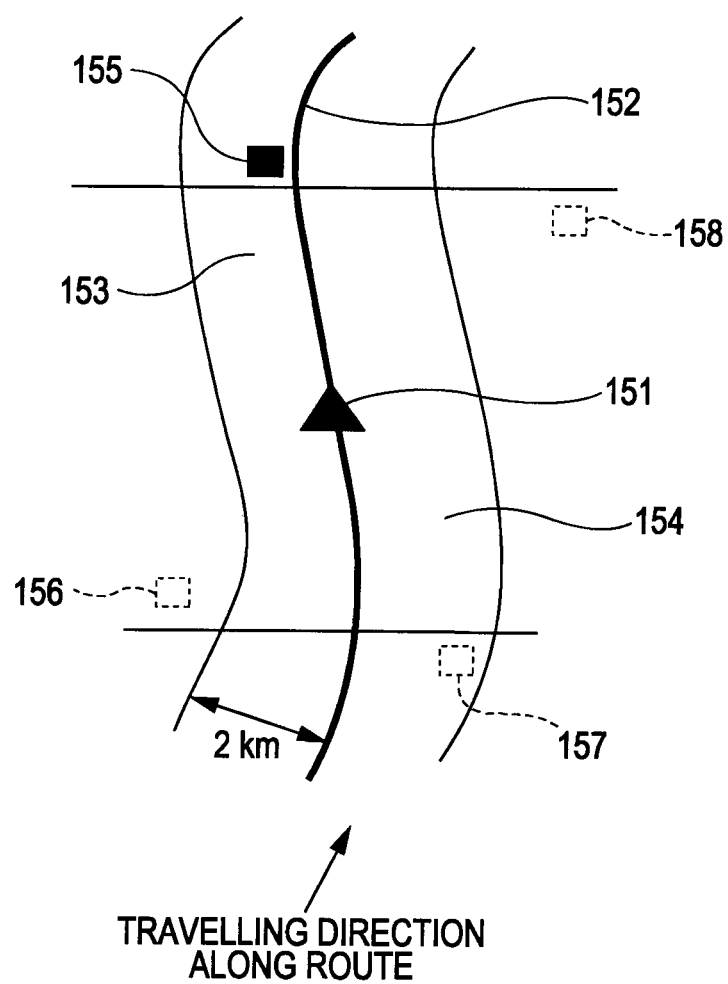
FIG. 5 is an explanatory drawing showing a guide route and facilities along the guide route displayed on the screen of a display unit of the navigation apparatus according to the embodiment of the present invention.

FIG. 5 is an explanatory drawing showing a guide route and facilities along the guide route displayed on the screen of the display unit of the navigation apparatus.

Figure 6:
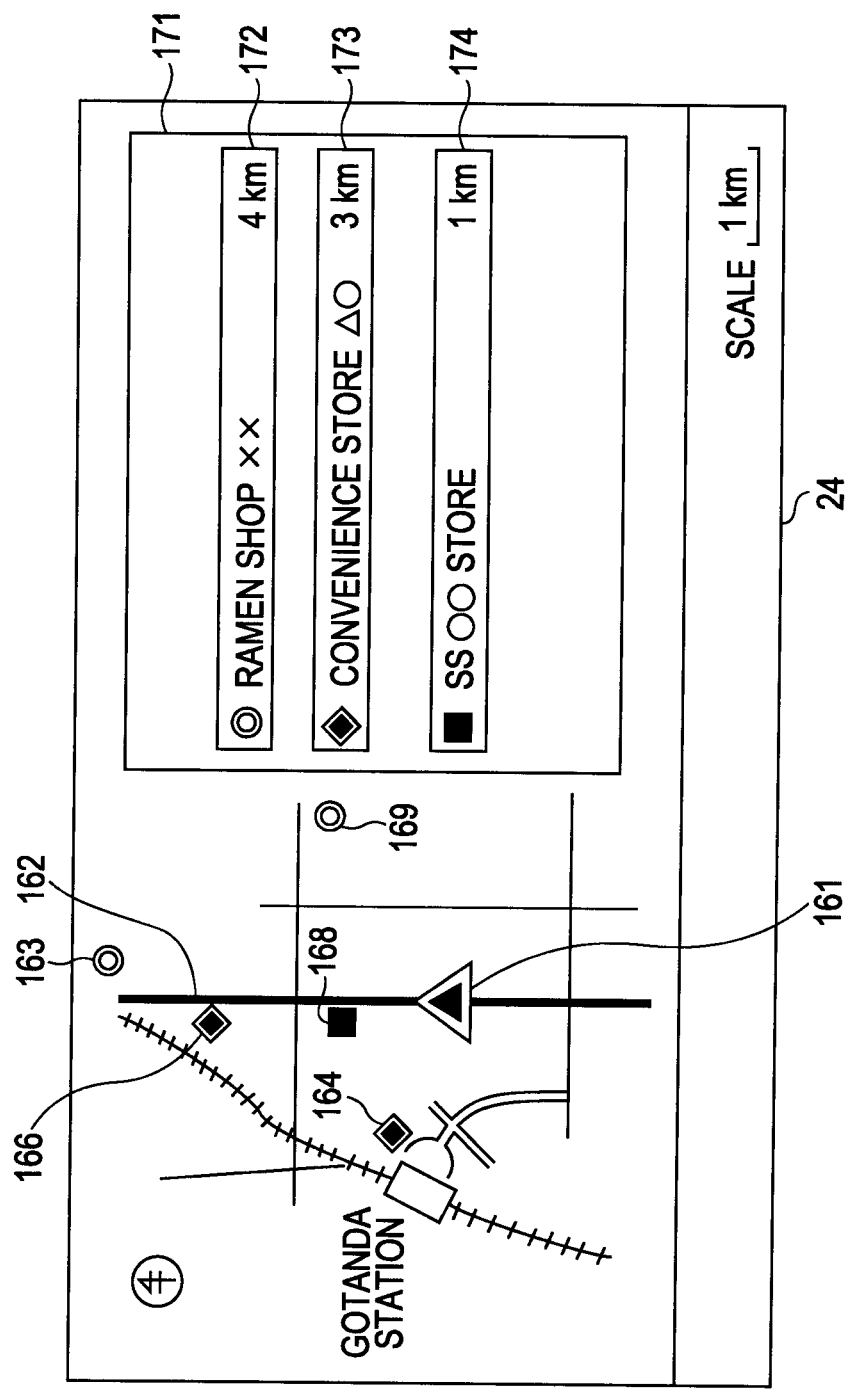
FIG. 6 is a explanatory drawing showing a guide route, facility information and a list of the pieces of the facility information displayed on the screen of a display unit of the navigation apparatus according to the embodiment of the present invention.

FIG. 6 is an explanatory drawing showing a guide route, facility information and a list of the pieces of the facility information displayed on the screen 24 of the display unit 11 of the navigation apparatus.

Figure 7:
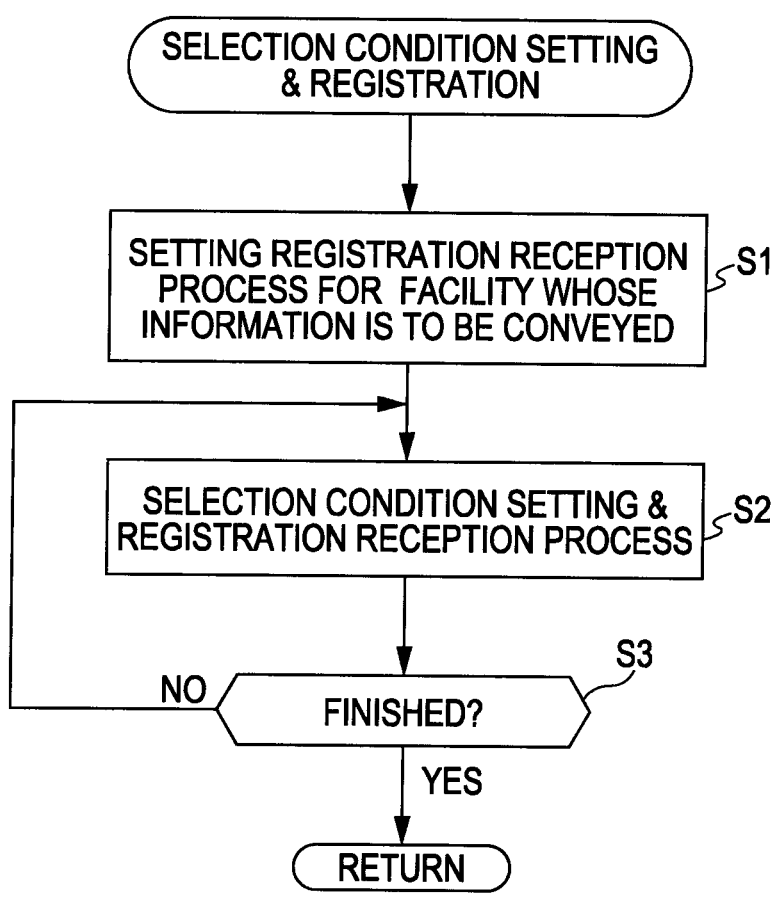
FIG. 7 is a flowchart showing one of the behaviors of the navigation apparatus according to the embodiment of the present invention.
Figure 8:
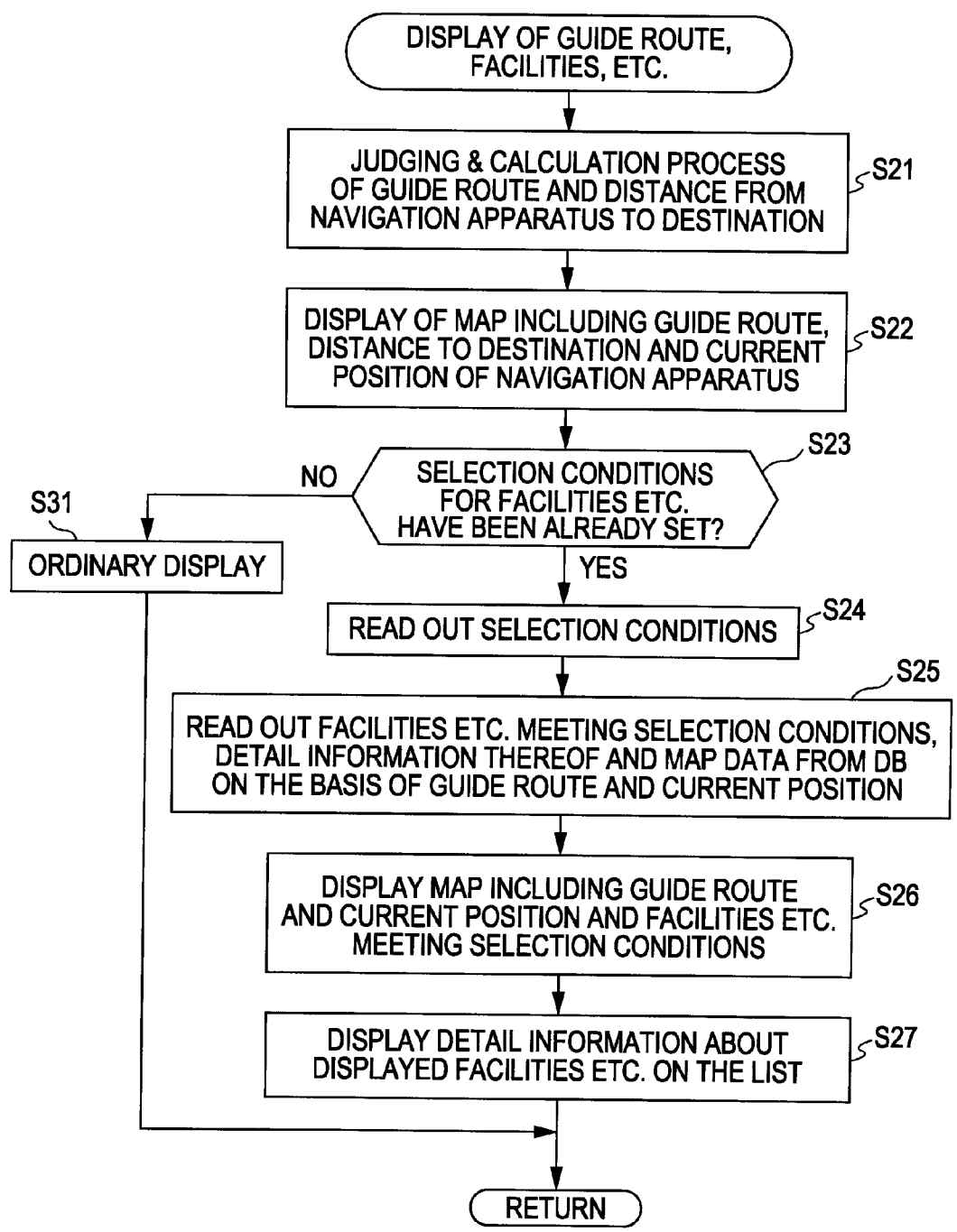
FIG. 8 is a flowchart showing another behavior of the navigation apparatus according to the embodiment of the present invention.

FIG. 7, FIG. 8 and FIG. 9 are flow charts showing the behaviors of the navigation apparatus.

In this navigation apparatus according to this embodiment, a user firstly specifies a destination.

Taking the specified destination into consideration, the controller 1 of the navigation apparatus calculates a guide route and a distance from the current position of the navigation apparatus detected by the GPS unit 3 to the specified destination with the use of map data, and stores the calculated results in the memory 2.

Then the controller 1 creates a route guidance screen that depicts the guide route from the current position of the navigation apparatus to the specified destination by displaying the current position of the navigation apparatus detected by the GPS unit 3 and the calculated guide route on the map displayed on the screen of the display unit 11.

In other words, the controller 1 searches the map data for the guide route from the current position of the navigation apparatus to the specified destination, and performs route guidance from the current position of the navigation apparatus to the destination on the map (road map) on the basis of the searched results.

In addition, if a user presets selection conditions for facilities the user wants to stop at, the navigation apparatus according to this embodiment automatically displays facility information about the facilities in the vicinity of the guide route on the screen to convey the facility information to the user.

The facility information to be conveyed about facilities in the vicinity of the guide route is automatically judged on the basis of the selection conditions with reference to the current position of the navigation apparatus and the guide route displayed on the screen of the display unit 11, and the facility information is displayed on the map on the screen.

In other words, the user performs an operation to set selection conditions regarding facilities whose information is to be conveyed and registers the selection conditions in advance when the navigation apparatus is not travelling.

Then, as the navigation apparatus travels along the guide route, the map, the guide route, the current position of the navigation apparatus and the like are displayed on the screen of the display unit 11.

At the same time, the facility information about facilities, stores and the like that meet the selection conditions is displayed on the screen in addition to the map, the guide route, and the current position of the navigation apparatus.

The setting & registration operation of the above-mentioned selection conditions will be described with reference to the "facility setting" screen in FIG. 4 and the flowchart in FIG. 7.

A user touches an "along route facility setting" icon (not shown in FIG. 4) on the screen of the display unit 11 of the navigation apparatus.

This touching operation performed on the "along route facility setting" icon by the user is judged by the controller 1 on the basis of the state of the "along route facility setting" icon being displayed on the screen of the display unit 11 and the touched position detecting signal that is output when a position on the touch panel 9 is touched by the user.

Judging that the "along route facility setting" icon is touched, the controller 11 outputs a "along route facility setting" screen 21 shown in FIG. 4 to the display unit 11.

Then the controller performs a facility setting & registration reception process to receive the setting and registration of the selection conditions (at step S1).

In this facility setting & registration reception process, a list of types of facilities and type selection icons are displayed on the "along route facility setting" screen 21 in order to urge the user to select some types of facilities whose information is to be conveyed.

The types of facilities are, for example, "ramen shop", "convenience store A", "golf course", and "○○ gas service station".

The list of facility types includes, for example, a list item 101 corresponding to "ramen shop", which is displayed along with its symbol and a list item selection icon 205 to select this list item 101.

A list item 102 corresponding to "convenience store A" is also displayed along with its symbol and a list item selection icon 206 to select this list item 102.

A list item 103 corresponding to "golf course" is also displayed along with its symbol and a list item selection icon 207 to select this list item 103.

A list item 104 corresponding to "○○ gas service station" is also displayed along with its symbol and a list item selection icon 208 to select this list item 104.

In addition, an upward scroll operation icon 111 that scrolls the range of the list of facility types displayed on the screen upward and a downward scroll operation icon 112 that scrolls the range of the list of types displayed on the screen downward are displayed on the "along route facility setting" screen 21.

In addition, an edit icon 115 and a back operation icon 116 for the operational flow to return to the previous screen are displayed in the lower part of the "along route facility setting" screen 21.

If necessary, the user operates the upward scroll operation icon 111 or the downward scroll operation icon 112 on the "along route facility setting" screen 21 to scroll the range of the list of types displayed on the screen upward or downward.

Then the user selects the types of facilities whose information is to be conveyed by touching the list item selection icons 205, 206, 207 and/or 208 to select the list items 101, 102, 103 and/or 104, respectively.

If a list item selection icon is touched, the list item selection icon is check-marked as shown by the list item selection icons 205, 206 and 208.

If the user touches the edit icon 115 after selecting the facilities whose information is to be conveyed, the controller 1 judges that the edit icon 115 has been touched.

Then the controller 1 replaces the "along route facility setting" screen 21 displayed on the display unit 11 with a "facility detail setting" screen 22, and performs a selection condition setting & registration reception process in order to urge the user to specify selection conditions for facilities whose information is to be conveyed. In this case the selection conditions are specified individually for the types of facilities—such as "ramen shop", "convenience store A", and "○○ gas service station" (at step S2).

In this selection condition setting & registration reception process, the list item, the list item selection icon of which is not check-marked on the "along route facility setting" screen 21, is omitted as shown in the "facility detail setting" screen 22.

On the other hand, the list items 121, 122 and 123, the list item selection icons of which are check-marked, are edited and displayed.

The upward scroll operation icon 124 and the downward scroll operation icon 125 are also displayed on the "facility detail setting" screen 22. They are used to scroll up or down the range including the list items 121, 122, 123, etc., displayed on the "facility detail setting" screen 22.

In addition, an add icon 135 to add a list item on which detail setting is performed and a back operation icon 136 for the operational flow to return to the previous screen are displayed in the lower part of the "facility detail setting" screen 22.

In this selection condition setting & registration reception process, the user selects a list item for which detail conditions are to be set among the list items 121, 122 and 123 displayed on the "facility detail setting" screen 22.

This selection is performed by touching the list item for which detail conditions are to be set among the list items 121, 122 and 123 displayed on the "facility detail setting" screen 22.

When the user selects the list item displayed on the "facility detail setting" screen 22, the controller 1 replaces the "facility detail setting" screen 22 with a "condition detail setting" screen 23, on which detail conditions are set, on the display unit 11.

A "type detail information setting condition input" field 141, a "left/right direction selection condition input" field 142 and a "distance setting condition input" field 143 are displayed on the "condition detail setting" screen 23.

A type selected on the "facility detail setting" screen 22 by the user is displayed in the "type detail information setting condition input" field 141.

One condition out of a condition "right direction", a condition "left direction" and a condition "left or right direction" is input into a "left/right direction selection condition input" field 142. The condition "right direction", the condition "left direction" or the condition "left and right direction" is used to specify the location of a facility whose information is to be conveyed. For example, if the condition "right direction" is input, information about a facility whose location is on the right side with reference to the travelling direction of the navigation apparatus along the guide route is conveyed.

A distance value is input into the "distance setting condition input" field 143 in order to limit the location of the facility whose information is to be conveyed by giving the maximum value of the direct distance from the guide route to the facility.

In addition, it is possible to install a "conveyed time period selection condition input" field so that a time period within which information about a facility is conveyed to the user can be set as a selection condition. For example, a "time period from 12:00 p.m. to 1:00 p.m." for the type "ramen shop" can be set in order to limit the time period.

In other words, this selection condition is defined by time information about a time period within which a facility is used by the user.

If the user selects the list item 123, that is, the type "◯◯ gas service station" on the "facility detail setting" screen 22, the "condition detail setting" screen 23 with "◯◯ gas service station" in the "type detail information setting condition input" field 141 is displayed.

Next, when the "condition detail setting" screen 23 with "◯◯ gas service station" in the "type detail information setting condition input" field 141 is displayed, the user further inputs a left/right direction selection condition into the "left/right direction selection condition input" field 142 of the "condition detail setting" screen 23.

One condition out of the condition "right direction", the condition "left direction" and the condition "left or right direction" is input into the "left/right direction selection condition input" field 142 as a left/right direction selection condition. A distance value is also input into the "distance setting condition input" field 143 as a distance setting condition.

An example setting displayed on the "condition detail setting" screen 23 is shown in FIG. 4. To put it concretely, the condition "left direction" is input into the "left/right direction selection condition input" field 142 as the left/right direction selection condition, and the condition "2 km" is input into the "distance setting condition input" field 143 as the distance setting condition.

The fix button 144, which is used to fix the selection conditions input into the "type detail information setting condition input" field 141, the "left/right direction selection condition input" field 142 and the "distance setting condition input" field 143, is displayed in the lower part of the "condition detail setting" screen 23.

By touching the fix button 144, the user fixes "left direction" input into the "left/right direction selection condition input" field 142, and "2 km" input into the "distance setting condition input" field 143 for the type "◯◯ gas service station" that has been already specified in the "type detail information setting condition input" field 141.

When the "type" condition, the "left/right direction selection" condition, and the "distance setting" condition are fixed, these selection conditions are categorized in accordance with the types and stored in a storage area of the memory 2.

Figure 3:
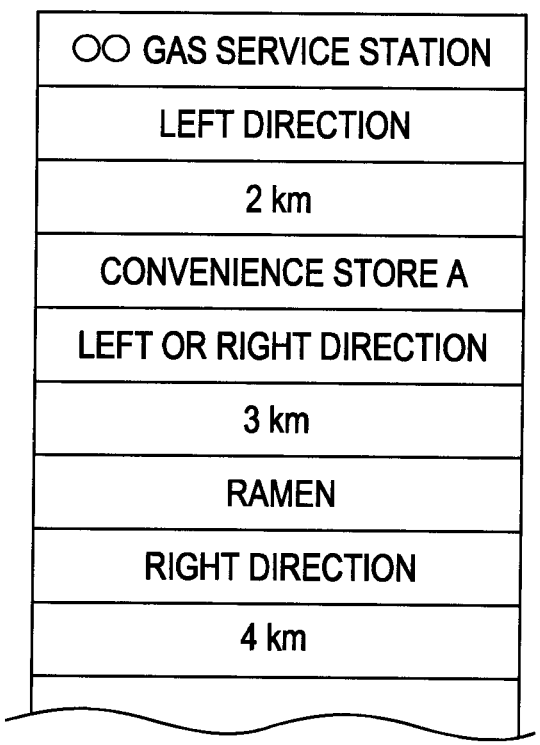
FIG. 3 is an explanatory drawing showing selection conditions stored in storage areas of a memory in the navigation apparatus according to the embodiment of the present invention, where the selection conditions are categorized in accordance with the types.

FIG. 3 is an explanatory drawing showing selection conditions stored in storage areas of the memory 2 in the navigation apparatus according to this embodiment of the present invention, where the selection conditions are categorized in accordance with the types and respectively stored in the corresponding storage areas of the memory 2.

When the controller 1 judges that the fix button 144 is touched, it replaces the "condition detail setting" screen 23 displayed on the display unit 11 with the "facility detail setting" screen 22.

Then the controller 1 judges whether the above-described selection condition setting & registration reception process is finished or not (at step S3).

The navigation apparatus according to this embodiment can be configured to automatically judge that this selection condition setting & registration reception process has finished if the touch panel 9 is not touched for a predefined time.

Alternatively, it can be also configured so that the selection condition setting & registration reception process is judged to have finished under the condition that a manual operation button installed to finish the above process is pushed.

If the controller 1 judges that the selection condition setting & registration reception process has not finished at step S3, the controller 1 continues the selection condition setting & registration reception process with the use of the "facility detail setting" screen 22 (at step S2).

As a result, after selecting another list item 122, that is, the type "convenience store A", the user can set new selection conditions about the type "convenience store A" whose information is to be conveyed.

FIG. 3 shows the state that the condition "left direction" is selected as the "left/right direction selection" condition, the condition "2 km" is selected as the "distance setting" condition for the type "◯◯ gas service station" and these selection conditions are stored in the memory 2.

FIG. 3 also shows the state that the condition "left or right direction" is selected as the "left/right direction selection" condition, the condition "3 km" is selected as the "distance setting" condition for the type "convenience store A" and these selection conditions are stored in the memory 2.

In addition, FIG. 3 also shows the state that the condition "right direction" is selected as the "left/right direction selection" condition, the condition "4 km" is selected as the "distance setting" condition for the type "ramen" and these selection conditions are stored in the memory 2.

In addition, if the "conveyed time period selection condition input" field is installed, conveyed time period conditions for individual types to which facilities and stores whose information is to be conveyed belong—such as the condition "0:00 p.m. to 1:00 p.m."—are stored in the memory 2.

In the state that the selection conditions are set and registered as described above, the controller 1 selects facilities, stores and conveyed time periods on the basis of the selection conditions in order to display them on the map where the current position of the navigation apparatus and the guide route have been already displayed.

In other words, the facilities, the conveyed time periods, etc. to be displayed are limited to those that meet the above selection conditions.

In FIG. 5, the facilities and stores, which meet the selection conditions, are displayed on the map along with the current position of the navigation apparatus and the guide route.

A numeric sign 155 in FIG. 5 indicates the current position of the navigation apparatus travelling along the guide route 152.

A numeric sign 153 indicates the area that is within the "distance setting" condition 2 km in a direct distance from the guide route 152 and on the left of the guide route 152 as well. On the other hand, a numeric sign 154 indicates the area that is within the "distance setting" condition 2 km in a direct distance from the guide route 152 and on the right of the guide route 152 as well.

A numeric sign 155 indicates one of the "◯◯ gas service station" affiliated group stores that meets the condition "◯◯ gas service station" as a "type" condition, the condition "left direction" as a "left/right direction selection" condition, and the condition "2 km" as a "distance setting" condition.

In other words, the condition "○○ gas service station" is set as a "type" condition, the condition "left direction" is set as a "left/right direction selection" condition, and the condition "2 km" is set as a "distance setting" condition in the example shown in FIG. 5.

In accordance with the above-described conditions, one of the "○○ gas service station" affiliated group stores indicated by a symbol ■ with the numeric sign 155 is displayed on the map, where the symbol ■ is on the left of the guide route 152 on which the current position 151 of the navigation apparatus is displayed, and in the area indicated by the numeric sign 153 within 2 km in a direct distance from the guide route 152 as well.

In other words, this "○○ gas service station" affiliated group store indicated by the numeric sign 155 is on the left of the guide route 152 where the current position 151 of the navigation apparatus is depicted, and this affiliated group store is also in the area indicated by the numeric sign 153 within 2 km in a direct distance from the guide route 152.

In this way, the affiliated group store that meets the above selection conditions is selected from the database stored in the CD-ROM, facility information about the affiliated group store is read out, and the position of the affiliated group store is displayed on the basis of a piece of facility information regarding the position of the affiliated group store.

On the other hand, the type "○○ gas service station" affiliated group stores that do not meet the above selection conditions are not displayed as indicated by numeric signs 156, 157 and 158.

In the explanatory drawing of the screen 24 of the display unit 11 shown in FIG. 6, the guide route 162 and the current position 161 of the navigation apparatus travelling along the guide route are displayed.

For the type "○○ gas service station", the condition "left direction" has been already set as a "left/right direction selection" condition, and the condition "2 km" has been already set as a "distance setting" condition as shown in the "facility detail setting" screen 22, and the "condition detail setting" screen 23 of the FIG. 4.

Therefore, a "○○ gas service station" affiliated group store indicated by a symbol ■ with a numeric sign 168 meets the selection conditions, where the symbol ■ is on the left of the guide route 162 on which the current position 161 of the navigation apparatus is displayed, and in the area within 2 km in a direct distance from the guide route 162 as well.

As a result, this "○○ gas service station" affiliated group store that meets the selection conditions is selected from the database. Then the facility information about this affiliated group store is read out and this affiliated group store is displayed on the map on the basis of a piece of facility information regarding the position of the affiliated group store.

Assuming that the condition "right direction" has been already set as a "left/right direction selection" condition, and the condition "5 km" has been already set as a "distance setting" condition for the type "ramen shop", a "ramen shop" affiliated group shop that meets the selection conditions is selected from the database.

To give examples in FIG. 6, two "ramen shop" affiliated group shops that are on the right of the guide route 162 on which the current position 161 of the navigation apparatus is displayed and in the area within 5 km in a direct distance from the guide route 162 as well are selected from the database. They are indicated by a symbol ⊙ with a numeric sign 163 and a symbol ⊙ with a numeric sign 169.

Then the facility information about these affiliated group shops are read out and these affiliated group shops are displayed on the map on the basis of facility information items regarding the positions of these shops.

In addition, if a conveyed time period selection condition is set, the facility information about a "ramen shop" affiliated group shop that meets the time period set in the field and the other selection conditions as well is read out, and this affiliated group shop is displayed on the map on the basis of a piece of facility information regarding the position of this "ramen shop".

Assuming that the condition "left or right direction" has been already set as a "left/right direction selection" condition, and the condition "10 km" has been already set as a "distance setting" condition for the type "convenience store A", a "convenience store A" affiliated group store that meets the selection conditions is selected from the database.

In FIG. 6, two "convenience store A" affiliated group stores that are on the right or left of the guide route 162 where the current position 161 of the navigation apparatus is displayed and in the area within 10 km in a direct distance from the guide route 162 as well are selected from the database. They are indicated by a symbol ♦ with a numeric sign 164 and a symbol ♦ with a numeric sign 166.

These two affiliated group stores indicated by a symbol ♦ are selected from the database and they are displayed on the map on the basis of facility information items regarding the positions of these stores.

In addition, the facility information and detail information about the facilities and stores, which are displayed on the map and meet the selection conditions described above, are displayed on the lists on the screen of the display unit 11.

These lists are displayed on the list display area 171 as list items 172, 173, and 174 so that they do not overlap the current position 161 of the navigation apparatus as shown in FIG. 6.

In an example shown in FIG. 6, the name of "ramen shop B" that is a "ramen shop" affiliated group shop and is nearest to the current position of the navigation apparatus and in the travelling direction of the navigation apparatus is displayed on the list item 172.

In addition, the facility information including the distance value "4 km" (the direct distance or the distance along the guide route) from the current position 161 of the navigation apparatus to "ramen shop B" and the detail information about "ramen shop B" are displayed.

The name of "convenience store △○" that is a "convenience store A" affiliated group store and is nearest to the current position of the navigation apparatus and in the travelling direction of the navigation apparatus is displayed on the list item 173.

In addition, the facility information including the distance value "3 km" (the direct distance or the distance along the guide route) from the current position 161 of the navigation apparatus to "convenience store △○" and the detail information about "convenience store △○" are displayed.

The name of "SS ○○ store" that is a "○○ gas service station" affiliated group store and is nearest to the current position of the navigation apparatus and in the travelling direction of the navigation apparatus is displayed on the list item 174.

In addition, the facility information including the distance value "1 km" (the direct distance or the distance along the guide route) from the current position 161 of the navigation apparatus to "SS ○○ store" and the detail information about "SS ○○ store" are displayed.

As described above, because the user can easily know the distance from the navigation apparatus of his/her own to the facility he/she wants to stop at, the navigation apparatus according to this embodiment can be said to have an improved user-friendly function.

FIG. 8 is a flowchart showing one of the behaviors of the navigation apparatus according to this embodiment of the present invention, where the navigation apparatus according to this embodiment displays facilities and stores that meet selection conditions set and registered in advance along with the current position of the navigation apparatus and the guide route as shown in FIG. 6.

The behavior of the navigation apparatus that performs route guidance from the current position of the navigation apparatus to the destination will be described below with reference to the flowchart in FIG. 8.

Firstly, the user specifies his/her destination.

After the destination is specified, the controller 1 calculates the guide route and the distance from the current position of the navigation apparatus to the specified destination with the use of map data (at step S21), and displays the results on the screen of the display unit 11.

As a result, the guide route and the distance to the destination are displayed on the map where the current position of the navigation apparatus has been already displayed (at step S22).

On the other hand, it is assumed that the user specifies in advance some kinds of facilities, that is, "types"—such as "ramen shop", "convenience store A", "golf course", and/or "○○ gas service station"—that he/she wants to stop at.

It is also assumed that the user also sets the positions of facilities, stores and the like to be displayed on the map by setting in advance a "left/right direction selection" condition by which the user specifies on which side, that is, on the left or on the right of the guide route, the facilities, stores and the like are with reference to the travelling direction of the navigation apparatus.

In addition, it is assumed that the user sets in advance a "distance setting" condition by which the user limits the positions of the facilities, stores and the like by setting the maximum distance from the current position of the navigation apparatus to them.

These preset selection conditions are categorized in accordance with the types and stored in the memory 2 as shown in FIG. 3.

The controller 1 judges whether these selection conditions have been already set or not (at step S23), and if the selection conditions have been already set, it reads out them from the memory 2 (at step S24).

Then, the controller 1 reads out facility information, detail information about facilities and stores that are categorized by the types and at the same time meet the selection conditions, map data regarding the guide route and the current position of the navigation apparatus from the database (at step S25).

In other words, the controller 1 searches the database for facilities to be displayed on the map on the basis of the selection conditions defined by the facility type information, the travelling direction of the navigation apparatus along the guide route, and the distances from the guide route to the facilities.

As a result, the facilities and stores categorized by the types and their facility information are displayed on the map on the screen of the display unit 11 where the guide route and the current position of the navigation apparatus have been already displayed (at step S26).

The positions of the facilities and stores categorized by the types are indicated on the map by symbols individually assigned to the types. In other words, the controller 1 displays the searched facilities along with their facility information on the map.

As a result, the facility information about the facilities, which the user wants to stop at, and are located in the travelling direction of the navigation apparatus along the guide route, is displayed on the map.

Therefore, because the navigation apparatus can appropriately display the facility information about the facilities user wants to stop at, the navigation apparatus according to this embodiment can be said to have another improved user-friendly function.

In addition, as shown in FIG. 6, the facility information including the names of the facilities and stores that meet the selection conditions, and the detail information about the facilities and stores are displayed on the list (at step S27).

Because the facility information and detail information of plural facilities and the like are displayed on the list and can be read through by the user, the navigation apparatus according to this embodiment can be said to have another improved user-friendly function.

Although a typical navigation apparatus has a function to show a user a route from the current position of his/her navigation apparatus to his/her destination, there is another usage where the user makes the navigation apparatus display only a map including the current position of the user's navigation apparatus while the navigation apparatus is travelling without using the above function.

FIG. 9 is a flowchart showing the behavior of a navigation apparatus according to this embodiment of the present invention, where the navigation apparatus selects and displays facilities, which meet selection conditions set and registered in advance, with reference to the current position of the navigation apparatus.

The behavior of the navigation apparatus in which the user's destination is not specified will be described hereinafter with reference to the flowchart of FIG. 9.

Because the user's destination is not specified, a guide route is not displayed and only the current position of the user's navigation apparatus is displayed on the map.

The user specifies one of the types that he/she wants to stop at—such as "ramen shop", convenience store A", "golf course" or "○○ gas service station" and the like.

The user also sets the position of the facility, the store or the like by setting in advance a "left/right direction selection" condition by which the user specifies on which side, that is, on the left or on the right of the guide route, the facility, the store or the like is with reference to the travelling direction of the navigation apparatus.

In addition, the user sets in advance the "distance setting" condition by which the user limits the position of the facility, the store or the like by specifying the maximum distance from the current position of the navigation apparatus to it.

These set selection conditions are categorized in accordance with the types and stored in the memory 2 as shown in FIG. 3.

If the selection conditions have been already set, the controller 1 reads out them from the memory 2 (at step S12).

With reference to the current position of the navigation apparatus, the controller 1 selects facilities and stores, which are categorized in accordance with the types and at the same time meet the selection conditions, from the database (at step S13).

Next, the controller 1 reads out the facility information and the detail information about the facilities and stores that meet the selection conditions from the database.

As a result, on the basis of the information items about the positions of the facilities and stores, the facilities and stores and their facility information items categorized by the types are displayed on the map on the screen of the display unit 11 where the current position of the navigation apparatus have been already displayed (at step S14).

In addition, as for the facilities and stores displayed on the screen of the display unit 11 at step S14, detail information including the direct distances from the position of the navigation apparatus to the individual facilities and stores, and the directions of the facilities and stores are calculated (at step S15).

Then the detail information including the calculated direct distances and directions about the facilities and stores is displayed on the list (at step S16).

In other words, the controller 1 operates under the condition that the function to show the user a route from the current position of his/her navigation apparatus to his/her destination is stopped, and searches the database for facilities to be displayed on the map on the basis of the selection conditions defined by the facility type information, the travelling direction of the navigation apparatus on a road, and the distance from the road to the facilities.

Then the controller 1 displays the facilities it has searched for on the map.

As a result, the facility information about the facilities, which the user wants to stop at and which are located in the travelling direction of the navigation apparatus and along the road where the navigation apparatus is travelling, is displayed on the map.

Therefore, even in the case where route guidance is not performed by the navigation apparatus, it can appropriately display the facility information about the facilities user wants to stop at, so that the navigation apparatus according to this embodiment can be said to have another improved user-friendly function.

In the flowcharts of FIG. 8 and FIG. 9, the behavior of the navigation apparatus that selects and displays facilities, which meet the selection conditions set and registered in advance, with reference to the current position of the navigation apparatus and the guide route has been described.

In a navigation apparatus like this, the map of a certain place—such as that of a certain city in Hokkaido—can be also displayed on the screen of the display unit 11 by a user's touching operation on the touch panel 9 of the display unit 11 and by his/her adjusting operation on the map scale displayed on the screen of the display unit 11 although he/she is in Tokyo.

In this case, the original point of the map showing the certain city in Hokkaido can be set to be matched with the middle point of the screen of the display unit 11 and also can be set to be indicated by a crosshair mark.

In addition, this navigation apparatus can be also configured so that, when the user touches a given position of the touch panel 9 of the display unit 11, the given point becomes the original point of the map, with the result that the display range of the map showing the city in Hokkaido is changed.

The behavior of the navigation apparatus in this case can be described in FIG. 8 by replacing "the current position of the navigation apparatus" with "the original point of the map displayed on the screen of the display unit 11" where a given point of the touch panel 9 touched by the user is set as the original point and indicated by the crosshair mark.

The navigation apparatus calculates a guide route from the position indicated by the crosshair mark to a displayed facility on the map and displays the guide route.

As for the map scale displayed on the screen of the display unit 11, the map scale can be automatically matched with the distance value preset as a "distance setting" condition.

To put it concretely, if the map scale displayed on the screen of the display unit 11 is "an inch to 100 m" and the distance value preset as a "distance setting" condition for a facility is several kilometers, the position of the facility may be out of the screen of the display unit 11.

In this case, if the map scale displayed on the screen of the display unit 11 is changed, for example, from "an inch to 100 m" to "an inch to 500 m", a facility located several kilometers from the current position of the navigation apparatus or from the guide route can be displayed on the screen of the display unit 11.

Therefore, if necessary, the navigation apparatus according to this embodiment can be configured so that the distance value preset as a "distance setting" condition for a facility is automatically matched with the map scale displayed on the screen of the display unit 11 in order for the facility to be displayed on the screen of the display unit 11.

As described above, the navigation apparatus according to this embodiment displays facilities on the map, where the current position of the navigation apparatus and the guide route have been already displayed, with the use of a database made of facility type information about the types of facilities and facility information about the facilities.

The navigation apparatus searches the database for facilities that meet the facility type information, the "left/right direction selection" condition with reference to the travelling direction of the navigation apparatus, the "distance setting" condition defined by the distance from the guide route, and the "conveyed time period selection" condition defined by the time period.

Then the navigation apparatus automatically displays the positions of the facilities that meet the above conditions on the map, where the current position of the navigation apparatus and the guide route have been already displayed, with the use of symbols corresponding to the types to which the individual facilities belong.

Therefore, the search for the information about specified facilities that a user wants to stop at is automatically performed with reference to the current position of the navigation apparatus and the guide route without any input operation for the search performed by the user.

As a result, the facility information about the specified facilities user wants to drop at is displayed along with the current position of the navigation apparatus and the guide route.

In consequence, if the user sets selection conditions regarding the facilities he/she wants to stop at in advance, the facility information about the facilities located in the travelling direction of his/her navigation apparatus along the guide route can be automatically and appropriately displayed.

Therefore, the navigation apparatus according to this embodiment of the present invention can provide an improved user-friendly function, which improves the commercial value of the apparatus.

The present application contains subject matter related to that disclosed in Japanese Priority Patent Application JP 2009-021764 filed in the Japan Patent Office on Feb. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus comprising:
   map display means that displays a map including a road and a facility on the basis of map data in a database that stores map data, facility type information regarding the type of the facility and facility information regarding the facility;
   route guidance means that searches for a guide route from the current position of the navigation apparatus to a specified destination on the basis of the map data and performs route guidance from the current position of the navigation apparatus to the destination on the map on the basis of the obtained guide route;
   selection means that searches the database for a facility to be displayed on the map on the basis of selection conditions defined by the facility type information, a current travelling direction of the navigation apparatus along the guide route, and a distance from the guide route to the facility, wherein a portion of the selection conditions are preset by a user prior to searching by the selection means, and the selection means determines, as the searched-for facility, a facility that satisfies the preset portion of the selection conditions, is located in the current travelling direction of the navigation apparatus along the guide route, and is located less than a maximum threshold distance from the current position of the navigation apparatus; and
   display control means that controls the map display means so that the map display means displays the facility obtained by the selection means along with its facility information on the map.

2. A navigation apparatus comprising:
   a map display section configured to display a map including a road and a facility on the basis of map data in a database that stores the map data, facility type information about the type of the facility and facility information about the facility;
   a route guidance section configured to search for a guide route from the current position of the navigation apparatus to a specified destination on the basis of the map data and perform route guidance from the current position of the navigation apparatus to the destination on the map on the basis of the obtained guide route;
   a selection section configured to search the database for a facility to be displayed on the map on the basis of selection conditions defined by the facility type information, a current travelling direction of the navigation apparatus along the guide route, and a distance from the guide route to the facility, wherein a portion of the selection conditions are preset by a user prior to searching by the selection section, and the selection section determines, as the searched-for facility, a facility that satisfies the preset portion of the selection conditions, is located in the current travelling direction of the navigation apparatus along the guide route, and is located less than a maximum threshold distance from the current position of the navigation apparatus; and
   a display control section configured to control the map display section so that the map display section displays the facility obtained by the selection section along with its facility information on the map,
   wherein the map display section, the route guidance section, the selection section, and the display control section are each implemented via at least one processor.

3. The navigation apparatus according to claim 2, wherein the display control section displays the facility obtained by the selection section on the map with the use of a symbol corresponding to the type of the facility.

4. The navigation apparatus according to claim 2, wherein the display control section further comprises a list display section that displays the facility information about the facility obtained by the selection section on the list.

5. The navigation apparatus according to claim 4, wherein the list display section displays on the list the facility information about the facility nearest to the current position of the navigation apparatus among facilities displayed on the map by the display control section.

6. The navigation apparatus according to claim 5, further comprising
   a calculation section configured to calculate the distance from the current position of the navigation apparatus to the nearest facility, wherein
   the list display section displays the facility information about the nearest facility as well as the distance calculated by the calculation section on the list, and
   the calculation section is implemented via at least one processor.

7. The navigation apparatus according to claim 2, wherein the selection conditions are defined not only by the facility type information, the travelling direction of the navigation apparatus along the guide route and the distance from the guide route, but also by time information that is information about a time period during which a user visits the facility.

8. The navigation apparatus according to claim 2, wherein, in the state of route guidance to the destination performed by the route guidance section being stopped,
   the selection section searches the database for a facility to be displayed on the map on the basis of selection conditions defined by the facility type information, the travelling direction of the navigation apparatus on the road where the navigation apparatus is travelling, and a distance to the facility from the road where the navigation apparatus is travelling; and
   the display control section displays the facility obtained by the selection section on the map.

9. The navigation apparatus according to claim 2, wherein the selection section searches for and automatically determines the facility to be displayed on the map, without any input operation for the search being performed by the user.

10. The navigation apparatus according to claim 2, wherein the selection section searches for and automatically determines the facility to be displayed on the map, on the basis of the present selection conditions without any additional user input operation for the search.

11. A non-transitory, computer-readable storage medium storing instructions that, when executed by a navigation apparatus, causes the navigation apparatus to perform a method, the method comprising:
   displaying a map including a road and a facility on the basis of map data in a database that stores the map data, facility type information about the type of the facility and facility information about the facility;
   searching for a guide route from the current position of the navigation apparatus to a specified destination on the basis of the map data and performing route guidance from the current position of the navigation apparatus to the destination on the map on the basis of the obtained guide route;

searching the database for a facility to be displayed on the map on the basis of selection conditions defined by the facility type information, a current travelling direction of the navigation apparatus along the guide route, and a distance from the guide route to the facility, wherein a portion of the selection conditions are preset by a user, and the searched-for facility is determined as a facility that satisfies the preset portion of the selection conditions, is located in the current travelling direction of the navigation apparatus along the guide route, and is located less than a maximum threshold distance from the current position of the navigation apparatus; and displaying the searched-for facility along with its facility information on the map.

* * * * *